United States Patent [19]

Walsh

[11] Patent Number: 5,677,369

[45] Date of Patent: Oct. 14, 1997

[54] COMPOSITE ARTICLE INCLUDING MODIFIED WAX, AND METHOD OF MAKING SAME

[75] Inventor: John Peter Walsh, St. Charles, Ill.

[73] Assignee: Masonite Corporation, Chicago, Ill.

[21] Appl. No.: 684,679

[22] Filed: Jul. 19, 1996

[51] Int. Cl.[6] .............................. C08L 1/02; C08K 5/01; C08K 5/098

[52] U.S. Cl. .................. 524/14; 524/13; 524/35; 524/275; 524/277; 524/399; 524/400; 524/487; 524/488; 524/394

[58] Field of Search .................. 524/13, 14, 15, 524/16, 35, 275, 277, 394, 399, 400, 487, 488

[56] References Cited

U.S. PATENT DOCUMENTS

| | | | |
|---|---|---|---|
| 2,038,113 | 4/1936 | Irey | 524/14 |
| 2,842,454 | 7/1958 | Short | 106/268 |
| 3,847,622 | 11/1974 | Brandl et al. | 106/10 |
| 3,937,678 | 2/1976 | Yasuda et al. | 106/278 |
| 4,013,475 | 3/1977 | Liebowitz et al. | 106/10 |
| 4,164,424 | 8/1979 | Klug et al. | 106/38.9 |
| 4,184,885 | 1/1980 | Pasco et al. | 428/306.6 |
| 4,279,547 | 7/1981 | Clem | 405/258 |

*Primary Examiner*—Peter A. Szekely
*Attorney, Agent, or Firm*—Marshall, O'Toole, Gerstein, Murray & Borun

[57] ABSTRACT

A method for the production of a material or article, e.g., an exterior building product such as wood composite siding, having improved weatherability properties. The material or article preferably has improved resistance to migration of wax sizing and moisture. The method preferably includes the use of salts of aluminum, calcium, zinc, and/or lithium cations, including salts of stearic acid and/or palmitic acid.

22 Claims, No Drawings

COMPOSITE ARTICLE INCLUDING MODIFIED WAX, AND METHOD OF MAKING SAME

BACKGROUND OF THE INVENTION

1. Field of the Invention

The invention relates generally to the production of exterior building products from composite materials. More particularly, the invention relates to a method of producing exterior building products, such as composite wood siding, that includes the use of treated wax sizing and that provides improved weatherability.

2. Brief Description of Related Technology

Exterior building products, such as roofing shingles, shutters, exterior siding panels, and other siding products have often been made from natural wood. However, due to cost, performance, and other considerations, alternatives to natural wood have been sought. Because cellulosic, e.g., wood, composite materials can be molded to have various shapes and sizes and to have various design and structural features found in natural wood, composite cellulosic or wood materials often are now used in the manufacture of such building products.

Many types of wood composites exist and include boards of bonded wood sheets and/or lignocellulosic material. Types of useful man-made boards are referred to by the following terms, for example: (a) fiberboards such as hardboard, medium density fiberboard, and softboard and (b) chipboards such as particleboard and oriented strandboard. Boards made of combinations of these materials are also useful. Fiberboard (and more particularly hardboard) is a preferred material for exterior building materials, such as siding and roofing shingles.

Many different methods of manufacturing these wood composites such as fiberboard are known in the art, for example as disclosed in U.S. Pat. No. 4,514,532 (Apr. 30, 1985) to Hsu et al. and U.S. Pat. No. 4,828,643 (May 9, 1989) to Newman et al. The disclosures of these patents are incorporated herein by reference. The principal processes for the manufacture of fiberboard include (a) wet felted/wet pressed or "wet" processes, (b) dry felted/dry pressed or "dry" processes, and (c) wet felted/dry pressed or "wet-dry" processes. Synthetic resins, such as phenolformaldehyde ("PF") resins or modified PF resins, are often used as binders in these processes.

Generally, in a wet process, cellulosic fillers or fibers (e.g., woody material which is subjected to fiberization in a pressurized refiner to form wood fibers) are blended in a vessel with large amounts of water to form a slurry. The slurry preferably has sufficient water content to suspend a majority of the wood fibers and preferably has a water content of at least 95 percent by weight ("weight percent"). The water is used to distribute a synthetic resin binder, such as a phenol-formaldehyde resin over the wood fibers. This mixture is deposited onto a water-pervious support member, such as a fine screen or a Fourdrinier wire, where much of the water is removed to leave a wet mat of cellulosic material having, for example, a moisture content of about fifty percent, based on the weight of dry cellulosic material. The wet mat is transferred to a press and consolidated under heat and pressure to form the molded wood composite.

A wet-dry forming process can also be used to produce wood composites. Preferably, a wet-dry process begins by blending cellulosic material (e.g., wood fiber) in a vessel with a large amount of water. This slurry is then blended with a resin binder. The blend is then deposited onto a water-pervious support member, where a large percentage (e.g., 50 weight percent or more) of the water is removed, thereby leaving a wet mat of cellulosic material having a water content of about 40 wt. % to about 60 wt. %, for example. This wet mat is then transferred to a zone where much of the remaining water is removed by evaporation to form a dried mat. The dried mat preferably has a moisture content of about 10 wt. % or less. The dried mat is then transferred to a press and consolidated under heat and pressure to form the wood exterior composite which may be a flat board or other exterior building product, for example. The product can have any desired shape depending on the intended use of the product.

In a dry process, the cellulosic fibers are generally conveyed in an airstream or by mechanical means, rather than by a liquid stream. Cellulosic or wood fibers supplied from a fiberizing apparatus can be first coated with a thermosetting resin binder, such as a phenol-formaldehyde resin, for example in a blowline blending procedure or by another (e.g., mechanical) blending procedure. The resin-coated fibers can then be randomly formed into a mat by air blowing the fibers onto a support member. The fibers, either before or after formation of the mat, can optionally be subjected to pre-press drying. The mat, typically having a moisture content of about 30 wt. % or less and usually less than 10 wt. % based on the weight of dry fibers, is then pressed under heat and pressure to cure the thermosetting resin and to compress the mat into an integral consolidated structure.

Wood-based composite exterior building products (e.g., wood composite siding) are generally required to have satisfactory weatherability (e.g., water resistance), since the products can be exposed to extreme elemental conditions (e.g., rain and sun). It is often attempted to improve the weatherability of exterior building products through the addition of sizing agents, such as waxes, to the materials used to form the products. However, there are often problems associated with the use of wax sizing agents, including the undesirable migration thereof, both during production (particularly in the high temperatures used during secondary processing such as priming and painting), as well as during use (including high temperatures encountered during exposure to the elements).

Therefore, it would be desirable to produce exterior building products which have beneficial water and heat resistance upon exposure to the elements over time. It would also be desirable to produce exterior building products that include wax sizing that avoids migration both over the short term and long term.

SUMMARY OF THE INVENTION

It is an object of the invention to overcome one or more of the problems described above.

Accordingly, the invention provides an exterior building product which has superior weatherability and wax migration resistance and eliminates or reduces the problems described above. The invention also provides a method of producing such an exterior building product.

The invention can be carried out by treating a cellulosic filler, e.g., wood fibers, with a modified wax. The wax is modified by adding a treatment compound (i.e., a modifier) thereto, followed by heating. The modifier is preferably a salt of stearic acid or palmitic acid, and more preferably salts including aluminum, calcium, zinc, and/or lithium cations. A mat formed from the modified wax, filler, and a binder is placed in a press and consolidated under heat and pressure.

The inventive method advantageously prevents the migration of wax sizing during the production of the exterior building product, as well as during use of the product. The inventive method advantageously provides an exterior siding product that has improved water resistance and stability.

Further objects and advantages of the invention will be apparent to those skilled in the art from the following detailed description, taken in conjunction with the appended claims.

DETAILED DESCRIPTION OF THE INVENTION

According to the invention, a method is provided for the production of various exterior building materials having improved weatherability.

The inventive method may generally be carried out by providing a modifier to wax sizing incorporated in order to improve weatherability of an exterior building product. The wax sizing is preferably modified so as to provide a wax that is resistant to migration and/or liquification within the product.

The modifier of the invention includes a salt of stearic acid or palmitic acid, and more preferably aluminum, calcium, zinc, and lithium salts of stearic acid and/or palmitic acid. Preferred modifiers include aluminum stearate, zinc stearate, lithium stearate, and aluminum palmitate. Aluminum stearate is the most preferred modifier. Therefore, while the method described below in detail may utilize an aluminum stearate modifier, any of the above modifiers can be used with the invention.

More specifically, the modified wax of the invention is preferably made by first combining (e.g., blending) wax sizing (a water retardant material) with an amount of one of the inventive modifiers disclosed above, preferably powdered aluminum stearate. This mixture is preferably heated to a temperature of at least about 200° F. (about 93° C.), and more preferably to a temperature in the range of about 220° F. (about 104° C.) to about 230° F. (about 110° C.), and stirred with a mixer. The temperature to which the mixture is heated is preferably below the melting point of the modifier. Heating facilitates dispersion of the modifier in the wax.

Any of a variety of commercially available waxes can be utilized in accordance with the invention. For example, suitable wax is available under the trade designations 618 and 6040 from Citgo Petroleum Corp. of Tulsa, Okla. Other waxes are available from Texaco Lubricants Co. of Houston, Tex., as well as Shell Oil Co. of Houston, Tex.

The aluminum stearate is preferably added at a rate in the range of about 1.0 to about 8.0 weight percent based on the weight of wax, more preferably in the range of about 2.5 to about 5.0 weight percent, and most preferably about 4.5 to about 5.0 weight percent. The inventive modifiers (such as aluminum stearate) are available from various sources, including Witco Corp. of Melrose Park, Ill.

After the modifier is sufficiently dispersed in the wax, the product can be referred to as a "modified wax." The modified wax can be combined with a cellulosic filler and an organic binder resin in the production of an exterior building product.

The inventive wood composite siding reacts well upon exposure to the elements because the wood composite is resistant to wax migration both over the short term and the long term. "Short term" wax migration refers to migration taking place under the elevated temperatures present during coating of the consolidated product in a post-press operation, as described below. This phenomenon generally results in poor topcoat (e.g., paint) adhesion due to the presence of wax on the primed surface of the article. "Long term" wax migration refers to migration taking place slowly over the lifetime of the finished product, resulting in discoloration due to dirt retention on the wax, for example. Wax migration problems are dependent upon both the time and temperature of exposure by the products. Exterior building products are exposed to high temperatures both over the short term (e.g., temperatures in the range of about 250° F. (about 121° C.) to about 300° F. (about 149° C.)) and long term (up to about 150° F. (about 65.5° C.), or even higher in some environments).

The invention is described in more detail below in conjunction with an example of a preferred method of manufacturing a wood composite siding product. However, the inventive modifier is applicable to methods for the manufacture of other composite exterior building products or other materials which will receive exposure to the elements. The invention is particularly useful in products where wax migration is a problem.

Suitable wood composites include hardboard and oriented strand board, as well as the other wood composites disclosed above. Although the inventive method is preferably utilized in conjunction with materials that may be cured under pressure and heat, the invention may in some cases also be useful in the production of materials that do not undergo cure under pressure and heat. Although any fiberboard production process may be utilized (e.g., wet felted processes or dry felted processes), a dry felted process is preferred.

According to a preferred embodiment of the invention, wood fibers are first received from a fiberizing apparatus. Suitable materials can be obtained from the pressurized refining of material from pine trees, fir trees, and/or mixed hardwood, for example. The modified wax described above is blended with the wood fibers, followed by mixing through air turbulence and/or mechanical means. The modified wax can be added, for example, at about 1 wt. % to about 4 wt. %, based on the weight of dry fibers.

The point of the mat formation stage at which one or more of the above-described modified waxes can be added is variable. For example, in a wet-felted process, the modifier can be added: (a) directly to the cellulosic material (e.g., wood chips or fiber) prior to formation of the slurry, (b) in a headbox or storage tank, or (c) at a combination of these points. In a dry process, the modifier can be added, for example: (a) to the cellulosic material (e.g., wood chips or fiber) prior to mixing with a binder, (b) in a blow line or blender after mixing with a binder, or (c) at a combination of these locations.

Various other additives known to those of skill in the art also can be utilized in accordance with the inventive method.

Next, the mixture of dry wood fiber and modified wax is combined with a thermosetting phenolformaldehyde binder resin in a mat formation stage. Any mat formation procedure known in the art can be used. In some cases the binder can be added to the filler prior to the modified wax.

The mat is optionally subjected to drying at this stage to reduce the moisture content thereof. The dry mat is then consolidated under heat and pressure to produce a wood composite shingle. Consolidation typically takes place with a press platen temperature in the range of about 400° F. (about 205° C.) to about 500° F. (about 260° C.) (preferably about 450° F. or about 230° C.) under about 1000 psig to about 1500 psig pressure.

The press time varies according to the moisture content of the mat; however, a press time in the range of about one minute to about 25 minutes is generally suitable. For a dry process, the press time is preferably in the range of about three minutes to about six minutes. For a wet process, a press time of about 15 to about 20 minutes is generally preferred. During pressing, the core temperature of the wood composite preferably reaches approximately 390° F. (about 199° C.). However, these conditions are completely variable depending, for example, upon the desired final product, the thickness of the mat, and the process by which the product is made. Those of skill in the art will be able to make modifications based upon this disclosure.

The product could be a composite of two materials, e.g., a first layer of chipboard or oriented strandboard secured to a hardboard overlay layer produced by the above method. Such layers can be pressed together in a single operation.

The product can be embossed in the press to resemble the wood grain of natural wood.

The siding product produced by the above method are preferably coated with a primer coat and/or paint. (Painting during the manufacturing operation will typically allow for installation in the field without any further treatment.) In such an operation, the coating is applied, followed by heating at a temperature in the range of about 200° F. (about 93° C.) to about 300° F. (about 148° C.) to cure and/or dry the coating. Even though this temperature is above the melting point of the unmodified wax, the flow of the wax is retarded in the products of the invention.

Although the inventive method is not limited to any particular mechanism, it is believed that the ions of the modifier salts (e.g., the trivalent aluminum ion) may interact with the wax molecules to prevent or reduce the flowability of the wax. Without the inventive modifier, high temperatures cause wax migration due to liquification of the wax.

The inventive wood composite can be utilized in applications that will be exposed to the elements (e.g., rain and heat) because the composite is resistant to wax migration both over (a) the short term (i.e., while the finished product is being coated, as described above) and (b) the long term (i.e., during use of the finished product). Further, the invention may permit the use of waxes that are more readily available and of lower quality (and therefore of less cost) while producing the same or better results than previously achievable. In addition, the invention allows the use of low-melt waxes in steam injection pressing.

The modified waxes of the invention were evaluated for the ability to resist short term wax migration. Short term wax migration is measured by first placing a sample of about 0.5 grams of wax on filter paper. The wax and filter paper are placed in an oven to expose the wax to controlled elevated temperatures. After a given period of exposure, the area through which the wax migrates is then measured. The wax treated with aluminum stearate show significantly greater resistance to wax migration.

Table I below shows the wax migration of three commercially available unmodified waxes when exposed to 120° F. (about 49° C.) for 24 hours.

TABLE I

Wax Migration at 120° F. for 24 Hours

| Wax | Migration (in.$^2$) |
|---|---|
| Microsoft (Texaco) | 3.80 |
| Shell | 1.16 |
| Citgo 618 | 0 |

Table II below shows the wax migration of three commercially available unmodified waxes when exposed to 140° F. (about 60° C.) for four hours.

TABLE II

Wax Migration at 140° F. for 4 Hours

| Wax | Migration (in.$^2$) |
|---|---|
| Microsoft (Texaco) | 2.81 |
| Shell | 1.49 |
| Citgo 618 | 0.82 |

Table III below shows the wax migration of three commercially available unmodified waxes when exposed to 250° F. (about 121° C.) for five minutes.

TABLE III

Wax Migration at 250° F. for 5 Minutes

| Wax | Migration (in.$^2$) |
|---|---|
| Microsoft (Texaco) | 1.35 |
| Shell | 1.06 |
| Citgo 618 | 1.15 |

Table IV below shows the wax migration (in square inches) of three commercially available waxes modified in accordance with the invention at 120° F. (about 49° C.) for 24 hours. The wax migration (in in.$^2$) of the inventive wax is compared to that shown in Table I for unmodified waxes (i.e., 0% modifier), for the same exposure (120° F. for 24 hours).

TABLE IV

Wax Migration of the Invention at 120° F. for 24 Hours

| Weight Percent Aluminum Stearate (based on wax) | Microsoft (Texaco) | Shell | Citgo 618 |
|---|---|---|---|
| 0 | 3.80 | 1.16 | 0 |
| 2.5 | 2.62 | 0.62 | 0 |
| 5.0 | 2.08 | 0.51 | 0 |
| 7.0 | 1.25 | 0.36 | 0 |

Table V below shows the wax migration (in square inches) of three commercially available waxes modified in accordance with the invention when exposed to 140° F. (about 60° C.) for 4 hours. The wax migration (in in.$^2$) of the modified wax is compared to that shown in Table II for untreated waxes.

TABLE V

Wax Migration of the Invention at 140° F. for 4 Hours

| Weight Percent Aluminum Stearate (based on wax) | Microsoft (Texaco) | Shell | Citgo 618 |
| --- | --- | --- | --- |
| 0 | 2.81 | 1.49 | 0.82 |
| 2.5 | 1.15 | 0.79 | 0.68 |
| 5.0 | 0.86 | 0.67 | 0.57 |
| 7.0 | 0.62 | 0 | 0 |

Table VI below shows the wax migration (in square inches) of three commercially available waxes modified in accordance with the invention when exposed to 250° F. (about 121° C.) for 5 minutes. The wax migration of the modified wax is compared to that shown in Table III for untreated waxes.

TABLE VI

Wax Migration of the Invention at 250° F. for 5 Minutes

| Weight Percent Aluminum Stearate (based on wax) | Microsoft (Texaco) | Shell | Citgo 618 |
| --- | --- | --- | --- |
| 0 | 1.35 | 1.06 | 1.15 |
| 2.5 | 0.65 | 0.58 | 0.72 |
| 5.0 | 0.37 | 0.35 | 0.50 |
| 7.0 | 0.15 | 0.10 | 0.18 |

It can be seen that the modifier of the invention significantly reduces the extent of wax migration of the tested samples, at each of the tested exposures.

In order to further investigate the advantageous properties of the invention, various fiberboard sheets were made in accordance with the inventive method disclosed above. Each sheet had a size of about four feet by about eight feet, and is suitable for use as an exterior building product. In a first trial, a batch of 40 fiberboard sheets of the invention were made by a method that included incorporation of a modified wax, as described above. In the modified wax, aluminum stearate was included at 5 wt. % based on the weight of the wax. A batch of 40 control sheets included the same wax in an unmodified state. All of the articles were then coated with paint in an operation during which the articles are exposed to temperatures of up to about 300° F. (about 149° C.) to coalesce and cure the paint.

All of the sheets were then evaluated for wax spots on the exterior thereof, which spots would indicate undesirable wax migration. The sheets were classified as having "no wax spots," "few wax spots," or "many wax spots." Table VII below summarizes the results of the first trial. A percentage and raw number of sheets in each category is shown. It can be seen that the method of the invention produces many more sheets having no wax spots when compared to sheets made by a method that does not utilize modified wax.

TABLE VII

FIRST TRIAL

| SHEETS | No Wax Spots | Few Wax Spots | Many Wax Spots |
| --- | --- | --- | --- |
| Control Sheets (unmodified wax) | 73% (29) | 0% | 27% (11) |
| Sheets With 5 wt. % aluminum stearate (based on wax) | 92% (37) | 0% | 8% (3) |

A second trial was conducted in the same manner as the first trial, except that four batches of 40 sheets each incorporated different amounts of aluminum stearate. (The indicated amount of aluminum stearate is based on the weight of unmodified wax.) The results (percentages and raw numbers) are summarized in Table VIII below. It can be seen that the method of the invention produces sheets with many fewer wax spots on the exterior of the sheets than a method that does not include incorporation of the modified wax.

TABLE VII

SECOND TRIAL

| SHEETS | No Wax Spots | Few Wax Spots | Many Wax Spots |
| --- | --- | --- | --- |
| Control Sheets (unmodified wax) | 0% | 17% (7) | 83% (33) |
| 2.5 wt. % Aluminum Stearate | 0% | 83% (33) | 17% (7) |
| 5.0 wt. % Aluminum Stearate | 0% | 77% (31) | 23% (9) |
| 7.5 wt. % Aluminum Stearate | 0% | 50% (20) | 50% (20) |

The foregoing description is given for clearness of understanding only, and no unnecessary limitations should be understood therefrom, as modifications within the scope of the invention will be apparent to those skilled in the art.

I claim:

1. A method of manufacturing a composite cellulosic article, comprising the sequential steps of:
    (a) combining a wax and a modifier comprising a compound selected from the group consisting of aluminum, calcium, zinc, and lithium salts of an acid selected from the group consisting of stearic acid and palmitic acid;
    (b) combining the product of step (a) with a binder resin and a cellulosic filler to form a mat; and
    (c) consolidating said mat to form an integral composite article.

2. The method of claim 1, wherein:
    said modifier is combined with said wax in an amount of about 1.0 to about 8.0 weight percent based on the weight of said wax.

3. The method of claim 1, wherein:
    said modifier is combined with said wax in an amount of about 2.5 to about 5.0 weight percent based on the weight of said wax.

4. The method of claim 1, wherein:
    said modifier is combined with said wax in an amount of about 4.5 to about 5.0 weight percent based on the weight of said wax.

5. The method of claim 1, wherein:
    said modifier comprises a compound selected from the group consisting of aluminum stearate, calcium stearate, zinc stearate, and lithium stearate.

6. The method of claim 1, wherein:

said modifier comprises aluminum stearate.

7. The method of claim 6, wherein:

said cellulosic filler comprises wood fibers.

8. The method of claim 7, further comprising the step of:

heating the product of step (a) to a temperature of at least about 200° F. (about 93° C.) prior to step (b).

9. The method of claim 8, wherein:

said heating step comprises heating the product of step (a) to a temperature in the range of about 220° F. (about 104° C.) to about 230° F. (about 110° C.).

10. A composite article made by the method recited in any one of claims 2–9.

11. A method for the preparation of an exterior building product by a dry process, comprising the sequential steps of:

(a) combining a wax and a modifier comprising a compound selected from the group consisting of aluminum, calcium, zinc, and lithium salts of an acid selected from the group consisting of stearic acid and palmitic acid;

(b) combining the product of step (a) with a binder resin and wood fibers to form a mat having a moisture content of about 30 wt. % or less; and (c) consolidating the product of step (b) under heat and pressure to form an integral composite article.

12. The method of claim 11, wherein:

said step (a) comprises (i) combining said modifier with said wax; and (ii) heating said combined modifier and wax to a temperature of at least about 200° F. (about 93° C.); and step (b) comprises (iii) combining said wood fiber and the product of substep (ii); and (iv) combining the product of substep (iii) with said binder resin.

13. The method of claim 12, wherein:

substep (iv) comprises combining said cellulosic filler and said binder resin in a blow line blending procedure.

14. The method of claim 12, wherein:

said heating step comprises heating the product of substep (i) to a temperature in the range of about 220° F. (about 104° C.) to about 230° F. (about 110° C.).

15. The method of claim 11, wherein:

said exterior building product is wood composite siding.

16. The method of claim 11, wherein:

said modifier is combined with said wax in an amount of about 1.0 to about 8.0 weight percent based on the weight amount of said wax.

17. The method of claim 11, wherein:

said modifier is combined with said wax in an amount of about 2.5 to about 5.0 weight percent based on the weight amount of said wax.

18. The method of claim 11, wherein:

said modifier comprises a compound selected from the group consisting of aluminum stearate, calcium stearate, zinc stearate, and lithium stearate.

19. The method of claim 11, wherein:

said modifier comprises aluminum stearate.

20. A composite article made by the method recited in any one of claims 11–15 or 17–19, wherein said modifier is combined with said wax in an amount of about 1.0 to about 8.0 weight percent based on the weight amount of said wax.

21. A consolidated, composite wood article useful as an exterior building product, comprising:

(a) wood fiber comprising at least 90 weight percent of the total weight of said article;

(b) a modified wax dispersed throughout said wood fiber, said wax modified by a modifier comprising a compound selected from the group consisting of aluminum, calcium, zinc, and lithium salts of an acid selected from the group consisting of stearic acid and palmitic acid; and (c) sufficient resin binder to adhere the wood fiber together into a structurally sound member.

22. The article of claim 21, wherein:

said modifier consists essentially of aluminum stearate.

* * * * *